United States Patent
Hiramatsu et al.

(10) Patent No.: US 11,377,133 B2
(45) Date of Patent: Jul. 5, 2022

(54) METHOD FOR FIXING STEERING SUPPORT, DEVICE FOR FIXING STEERING SUPPORT, AND METHOD FOR CHECKING DEFORMATION OF INSTRUMENT PANEL REINFORCEMENT BODY

(71) Applicant: TOYOTA JIDOSHA KABUSHIKI KAISHA, Toyota (JP)

(72) Inventors: Koichi Hiramatsu, Toyota (JP); Shinya Mizuno, Nagoya (JP); Nobuyuki Nagai, Toyota (JP); Koji Okamura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 16/739,249

(22) Filed: Jan. 10, 2020

(65) Prior Publication Data
US 2020/0262465 A1    Aug. 20, 2020

(30) Foreign Application Priority Data
Feb. 15, 2019    (JP) .............................. JP2019-025734

(51) Int. Cl.
*B21D 39/04*    (2006.01)
*B62D 65/14*    (2006.01)
(Continued)

(52) U.S. Cl.
CPC .............. *B62D 1/16* (2013.01); *B21D 39/04* (2013.01); *B21D 39/203* (2013.01); *B62D 25/08* (2013.01);
(Continued)

(58) Field of Classification Search
CPC .... B21D 39/04; B21D 39/044; B21D 39/046; B21D 39/20; B21D 39/203; B62D 65/02;
(Continued)

(56) References Cited

U.S. PATENT DOCUMENTS

| 4,724,693 A | 2/1988 | Tedder | |
| 2014/0333094 A1* | 11/2014 | Matsushita | B62D 1/16 296/193.02 |

(Continued)

FOREIGN PATENT DOCUMENTS

| JP | 2010194579 A | * | 9/2010 |
| JP | 2018-043547 A | | 3/2018 |

(Continued)

*Primary Examiner* — Jermie E Cozart
(74) *Attorney, Agent, or Firm* — Oliff PLC

(57) ABSTRACT

A method for fixing a steering support capable of improving efficiency when the steering support is fixed to an instrument panel reinforcement body is provided. The method for fixing the steering support according to one aspect of the present disclosure includes processes of: passing an instrument panel reinforcement body through a first through-hole formed in a steering support; and increasing the pressure inside an area of the instrument panel reinforcement body covered with the steering support, plastically deforming the area of the instrument panel reinforcement body from an inside to an outside, and pressing a circumferential surface of the first through-hole of the steering support by an outer circumferential surface of the area of the instrument panel reinforcement body.

3 Claims, 13 Drawing Sheets

(51) Int. Cl.
  *B62D 1/16*    (2006.01)
  *B62D 25/14*   (2006.01)
  *B21D 39/20*   (2006.01)
  *B62D 25/08*   (2006.01)
  *B62D 65/02*   (2006.01)

(52) U.S. Cl.
  CPC ........... *B62D 25/14* (2013.01); *B62D 25/145* (2013.01); *B62D 65/02* (2013.01); *B62D 65/14* (2013.01); *B21D 39/044* (2013.01); *B21D 39/046* (2013.01); *B21D 39/20* (2013.01); *B21D 39/206* (2013.01); *Y10T 29/4911* (2015.01); *Y10T 29/49803* (2015.01); *Y10T 29/49805* (2015.01)

(58) Field of Classification Search
  CPC ..... B62D 1/16; B62D 65/14; Y10T 29/49803; Y10T 29/49911
  See application file for complete search history.

(56) References Cited

U.S. PATENT DOCUMENTS

| | | | |
|---|---|---|---|
| 2017/0349218 A1* | 12/2017 | Nishimura | B62D 25/145 |
| 2018/0072351 A1 | 3/2018 | Kaneko et al. | |
| 2019/0022731 A1* | 1/2019 | Yabuoshi | B21D 26/14 |
| 2020/0010122 A1* | 1/2020 | Hashimura | B21D 39/06 |

FOREIGN PATENT DOCUMENTS

| | | |
|---|---|---|
| JP | 2018-090163 A | 6/2018 |
| WO | 00/06337 A1 | 2/2000 |

\* cited by examiner

METHOD FOR FIXING STEERING SUPPORT, DEVICE FOR FIXING STEERING SUPPORT, AND METHOD FOR CHECKING DEFORMATION OF INSTRUMENT PANEL REINFORCEMENT BODY

CROSS REFERENCE TO RELATED APPLICATIONS

This application is based upon and claims the benefit of priority from Japanese patent application No. 2019-025734, filed on Feb. 15, 2019, the disclosure of which is incorporated herein in its entirety by reference.

BACKGROUND

The present disclosure relates to a method for fixing a steering support, a device for fixing a steering support, and a method for checking deformation of an instrument panel reinforcement body, and relates to, for example, a method and a device for fixing a steering support for supporting a steering column to an instrument panel reinforcement body having a pipe shape, and a method for checking deformation of the instrument panel reinforcement body.

In general, an instrument panel reinforcement is provided in a vehicle body in order to support a steering, an instrument panel and the like and to improve rigidity of the vehicle body. This instrument panel reinforcement has a configuration in which a steering support for supporting a steering column is fixed to an instrument panel reinforcement body having a pipe shape, as disclosed in Japanese Unexamined Patent Application Publication No. 2018-90163.

In this case, as shown in FIG. 18, in a typical instrument panel reinforcement 100, a steering support 101 is divided into a first divided piece 101a and a second divided piece 101b, an instrument panel reinforcement body 102 is held between the first divided piece 101a and the second divided piece 101b, and the first divided piece 101a and the second divided piece 101b are joined together using a bolt 103.

SUMMARY

The applicant has found the following problem. Since the typical instrument panel reinforcement 100 includes the steering support 101, which is a divided structure formed of the first divided piece 101a and the second divided piece 101b, and the first divided piece 101a and the second divided piece 101b are joined together using the bolt 103, the typical instrument panel reinforcement 100 has a problem that the number of processes required to fix the steering support 101 to the instrument panel reinforcement body 102 is large and the efficiency is low.

The present disclosure has been made in view of the aforementioned problem, and provides a method for fixing a steering support, a device for fixing a steering support, and a method for checking deformation of the instrument panel reinforcement body capable of improving efficiency when the steering support is fixed to the instrument panel reinforcement body.

A method for fixing a steering support according to one aspect of the present disclosure is a method for fixing a steering support for supporting a steering column to an instrument panel reinforcement body having a pipe shape, the method including the processes of:

passing the instrument panel reinforcement body through a first through-hole formed in the steering support; and increasing the pressure inside an area of the instrument panel reinforcement body covered with the steering support, plastically deforming the area of the instrument panel reinforcement body from an inside to an outside, and pressing a circumferential surface of the first through-hole of the steering support by an outer circumferential surface of the area of the instrument panel reinforcement body.

As described above, in a state in which the instrument panel reinforcement body is passed through the first through-hole formed in the steering support, the area covered with the steering support of the instrument panel reinforcement body is plastically deformed and the circumferential surface of the first through-hole of the steering support is pressed, whereby the steering support is fixed to the instrument panel reinforcement body.

According to the above structure, the process of joining the first divided piece and the second divided piece to the instrument panel reinforcement body by a bolt, which is required in the typical steering support, is not required. Therefore, the number of processes required to fix the steering support to the instrument panel reinforcement body can be reduced, whereby it is possible to improve efficiency when the steering support is fixed to the instrument panel reinforcement body.

The aforementioned method for fixing the steering support preferably includes pressing the circumferential surface of the first through-hole of the steering support in such a way that the deformation amount of the steering support becomes equal to or larger than a predetermined first deformation amount at which the steering support starts to be elastically deformed but smaller than a predetermined second deformation amount at which the steering support is broken.

According to the above structure, the steering support appears the elastic force, and the steering support strongly constrains the area of the instrument panel reinforcement body covered with the steering support. As a result, the steering support can be strongly fixed to the instrument panel reinforcement body.

The aforementioned method for fixing the steering support preferably include causing, when the instrument panel reinforcement body is plastically deformed, a part of the instrument panel reinforcement body to bulge in a second through-hole that penetrates the steering support in a thickness direction of the steering support or causing a part of the instrument panel reinforcement body to bulge in such a way that it contacts a thinned part formed on the circumferential surface of the first through-hole of the steering support, thereby causing the instrument panel reinforcement body to bulge and causing the thinned part to be deformed.

As described above, a part of the instrument panel reinforcement body is caused to bulge in the second through-hole of the steering support, or a part of the instrument panel reinforcement body is caused to bulge in such a way that it contacts the thinned part of the steering support, whereby it is possible to check whether the instrument panel reinforcement body is plastically deformed based on the deformed degree of the instrument panel reinforcement body.

A device for fixing a steering support according to one aspect of the present disclosure is a device for fixing a steering support for supporting a steering column to an instrument panel reinforcement body having a pipe shape, the device including:

a first pipe member that is inserted into the instrument panel reinforcement body that has been passed through a first through-hole formed in the steering support, one end part of the first pipe member being blocked;

a first packing that is fixed to one end part of the first pipe member, and is arranged in an area of the instrument panel reinforcement body covered with the steering support when one end part of the first pipe member is inserted to a predetermined position inside the instrument panel reinforcement body;

a second packing fixed to the first pipe member in such a way that the second packing is arranged in the area of the instrument panel reinforcement body with a gap between it and the first packing when one end part of the first pipe member is inserted to the predetermined position inside the instrument panel reinforcement body; and a pump that is connected to another end part of the first pipe member and is configured to supply a pressure medium to the first pipe member, in which in a state in which one end part of the first pipe member is inserted to the predetermined position inside the instrument panel reinforcement body, the pressure medium is supplied to a sealed space formed of the first packing, the second packing, an outer circumferential surface of the first pipe member, and an inner circumferential surface of the instrument panel reinforcement body from a through-hole that is formed between the first packing and the second packing in the first pipe member and penetrates the first pipe member in a thickness direction of the first pipe member.

According to this configuration, by plastically deforming the area covered with the steering support of the instrument panel reinforcement body and pressing the circumferential surface of the first through-hole of the steering support, the steering support can be fixed to the instrument panel reinforcement body. Therefore, the process of joining the first divided piece and the second divided piece to the instrument panel reinforcement body by a bolt, which is required in the typical steering support, is not required. Therefore, the number of processes required to fix the steering support to the instrument panel reinforcement body can be reduced, whereby it is possible to improve efficiency when the steering support is fixed to the instrument panel reinforcement body.

The aforementioned device for fixing the steering support preferably includes:

a second pipe member through which the first pipe member is passed in such a way that it can be slid, the second pipe member including a through-hole penetrating in a thickness direction;

a reaction force part through which another end part of the first pipe member is passed in such a way that it can be slid, the reaction force part being fixed in such a way that the reaction force part is not displaced with respect to the instrument panel reinforcement body; and an enlarged diameter part formed in one end part of the first pipe member;

a driving part that draws in the first pipe member, in which the first packing is arranged between the enlarged diameter part of the first pipe member and the second pipe member, the second packing is arranged between the second pipe member and the reaction force part, and when the pressure medium is supplied to the sealed space, the first pipe member is drawn in by the driving part, and the first packing and the second packing are deformed by a reaction force received from the reaction force part, whereby a gap between the first pipe member and the instrument panel reinforcement body is blocked and a through-hole of the first pipe member and a through-hole of the second pipe member are communicated with each other.

According to this configuration, when the first packing and the second packing are inserted into the instrument panel reinforcement body or removed from the instrument panel reinforcement body, the first packing and the second packing are not likely to come into contact with the inner circumferential surface of the instrument panel reinforcement body. It is therefore possible to prevent the first packing and the second packing from being damaged.

A device for fixing a steering support according to one aspect of the present disclosure is a device for fixing a steering support for supporting a steering column to an instrument panel reinforcement body having a pipe shape, the device including:

a constraint die that can be opened and closed, and constrains an outer circumferential surface of a temporarily assembled unit in which the instrument panel reinforcement body is passed through a through-hole formed in the steering support in a state in which the constraint die is closed;

a first sealed part configured to block one opening of the instrument panel reinforcement body;

a second sealed part configured to block another opening of the instrument panel reinforcement body; and a pump configured to supply a pressure medium to the inside of the instrument panel reinforcement body via the first sealed part.

According to this configuration, by plastically deforming the area covered with the steering support of the instrument panel reinforcement body and pressing the circumferential surface of the through-hole of the steering support, the steering support can be fixed to the instrument panel reinforcement body. Therefore, the process of joining the first divided piece and the second divided piece to the instrument panel reinforcement body by a bolt, which is required in the typical steering support, is not required. Therefore, the number of processes required to fix the steering support to the instrument panel reinforcement body can be reduced, whereby it is possible to improve efficiency when the steering support is fixed to the instrument panel reinforcement body.

A method for checking deformation of the instrument panel reinforcement body according to one aspect of the present disclosure is a method for checking deformation of an instrument panel reinforcement body having a pipe shape when a steering support for supporting a steering column is fixed to the instrument panel reinforcement body, the method including:

causing, when the pressure inside an area of the instrument panel reinforcement body that has been passed through a first through-hole formed in the steering support covered with the steering support is increased, a part of the instrument panel reinforcement body to bulge in a second through-hole that penetrates the steering support in a thickness direction of the steering support, or causing a part of the instrument panel reinforcement body to bulge in such a way that it contacts a thinned part formed on the circumferential surface of the first through-hole of the steering support, thereby causing the instrument panel reinforcement body to bulge and causing the thinned part to be deformed.

As described above, by causing a part of the instrument panel reinforcement body to bulge in the second through-hole of the steering support or causing a part of the instrument panel reinforcement body to bulge in such a way that it contacts the thinned part of the steering support, it is possible to check whether the instrument panel reinforcement body is plastically deformed based on the deformed degree of the instrument panel reinforcement body.

According to the present disclosure, it is possible to improve efficiency when the steering support is fixed to the instrument panel reinforcement body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarification of the description, the following descriptions and the drawings are simplified as appropriate.

First Embodiment

A method for fixing a steering support, a device for fixing a steering support, and a method for checking deformation of an instrument panel reinforcement body according to this embodiment will be explained. First, a structure of the instrument panel reinforcement in which the steering support is fixed to the instrument panel reinforcement body in the method for fixing the steering support according to this embodiment will be explained.

Figure 1:
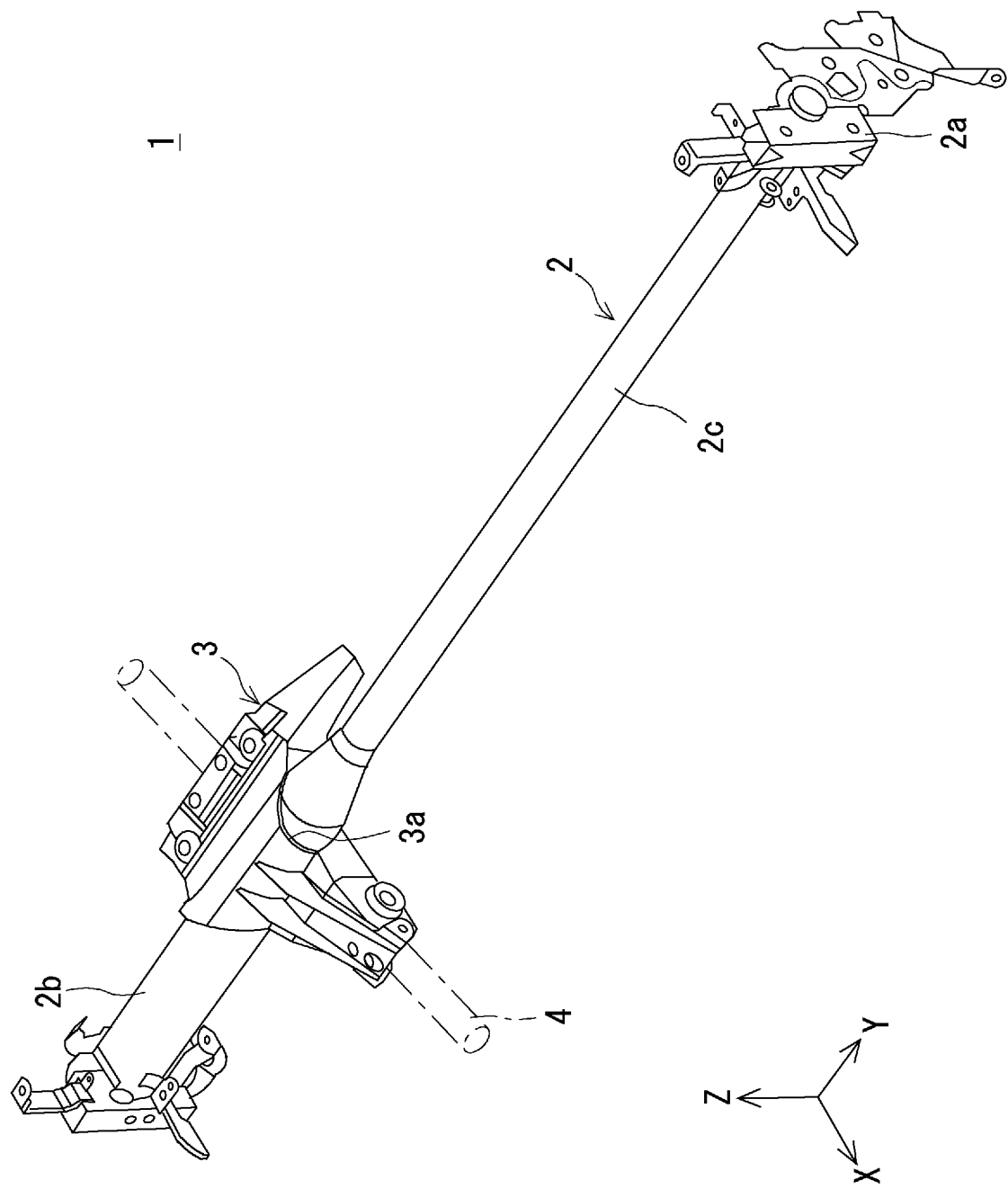
FIG. 1 is a perspective view schematically showing an instrument panel reinforcement according to a first embodiment.
Figure 2:
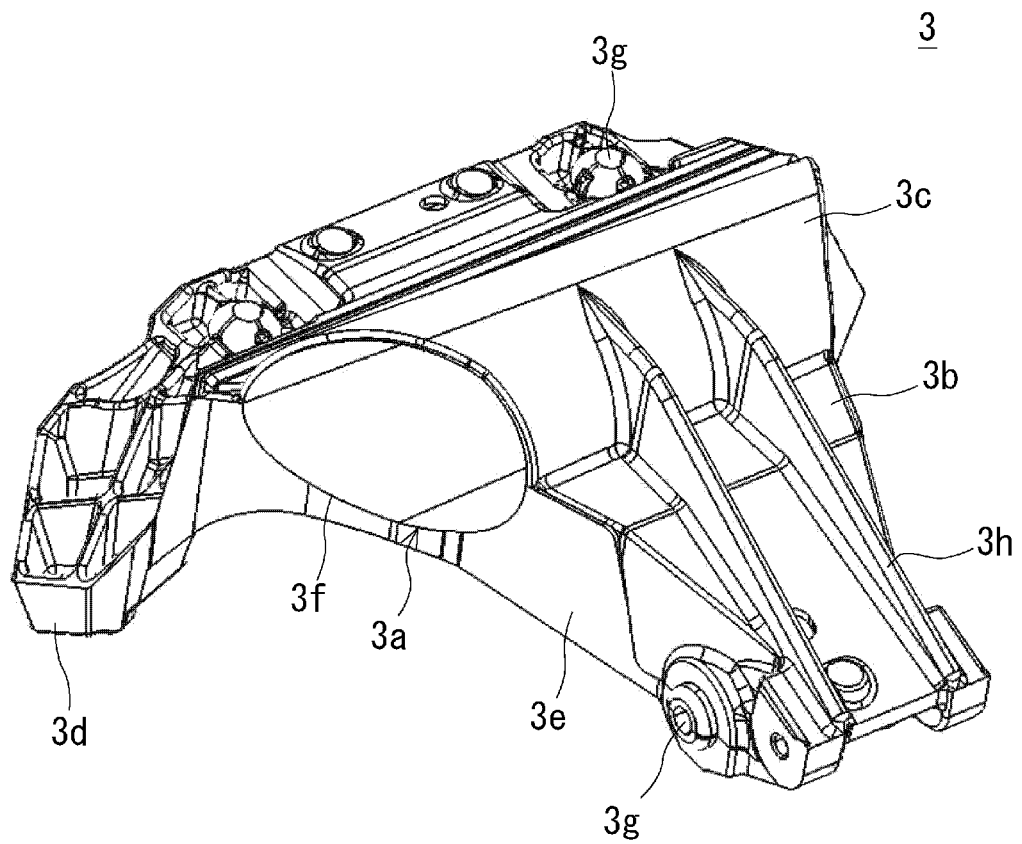
FIG. 2 is a perspective view of a steering support of the instrument panel reinforcement according to the first embodiment when it is seen from a Z-axis positive side.
Figure 2:
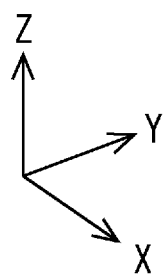
Figure 3:
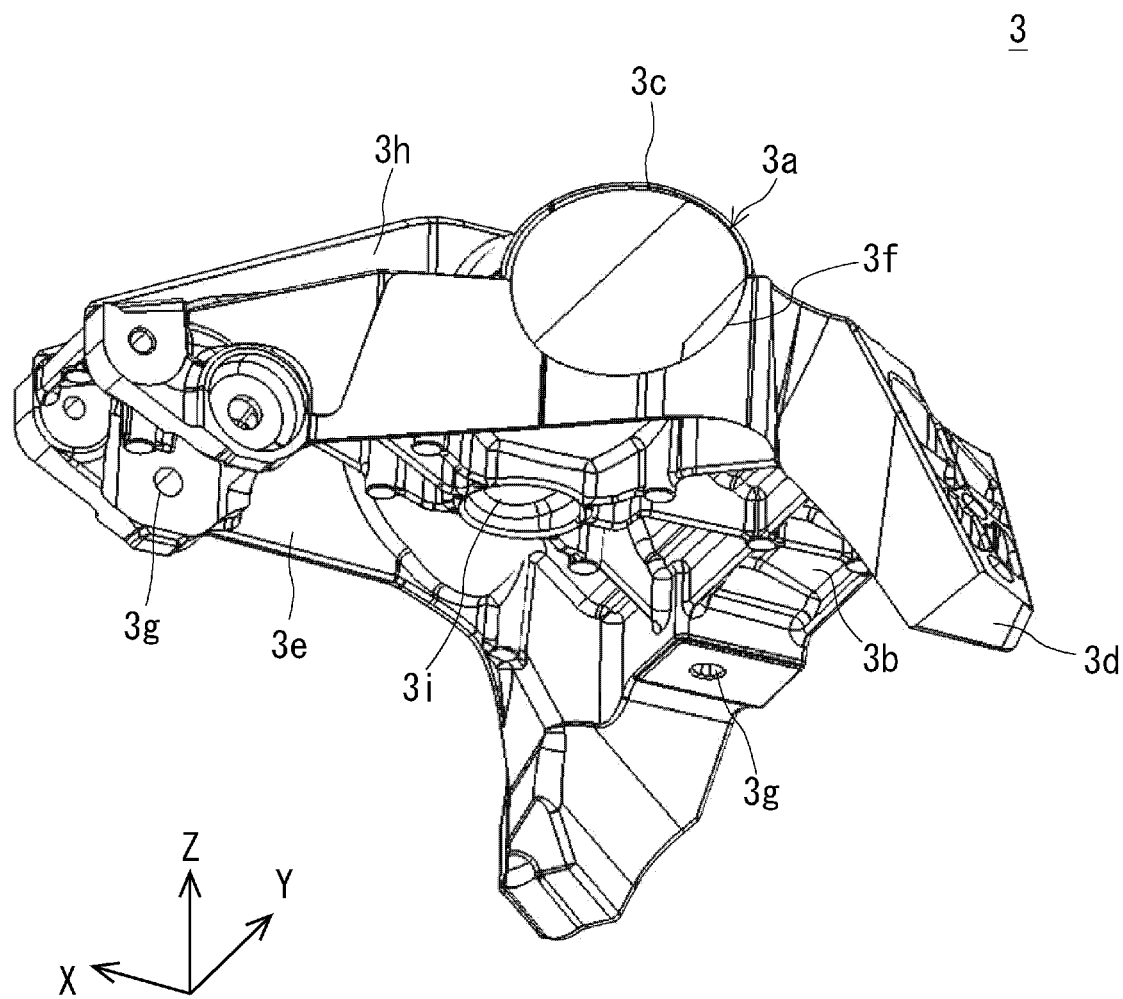
FIG. 3 is a perspective view of the steering support of the instrument panel reinforcement according to the first embodiment when it is seen from the Z-axis negative side.

FIG. 1 is a perspective view schematically showing an instrument panel reinforcement according to this embodiment. FIG. 2 is a perspective view showing a steering support of the instrument panel reinforcement according to this embodiment when it is seen from a Z-axis positive side. FIG. 3 is a perspective view showing the steering support of the instrument panel reinforcement according to this embodiment when it is seen from the Z-axis negative side. The following description will be given using a three-dimensional (XYZ) coordinate system in order to clarify the explanation. The Y-axis direction corresponds to a vehicle width direction.

As shown in FIG. 1, an instrument panel reinforcement 1 includes an instrument panel reinforcement body 2 and a steering support 3. The instrument panel reinforcement body 2, which is a pipe member, has, for example, a cylindrical shape as its basic form.

Plate-like extensions 2a are provided in the respective ends of the instrument panel reinforcement body 2 in the Y-axis direction. This instrument panel reinforcement body 2 is arranged in such a way that it is extended in the Y-axis direction, and each of the extensions 2a is fixed to a front pillar of the vehicle body.

In this case, the instrument panel reinforcement body 2 preferably includes a first part 2b arranged on the side of the driver's seat (in FIG. 1, on the Y-axis negative side) and a second part 2c arranged on the side of the passenger's seat (in FIG. 1, on the Y-axis positive side), and the first part 2b preferably has a diameter larger than that of the second part 2c.

Accordingly, it is possible to cause the first part 2b to properly support a heavy-weight object such as the steering support 3. The diameter of the first part 2b is preferably expanded toward the Y-axis negative side, the reasons therefor being explained later. However, the shape of the instrument panel reinforcement body 2 is not limited to the above one and the first part 2b and the second part 2c may have the same diameter.

As shown in FIG. 1, the steering support 3 is fixed to the instrument panel reinforcement body 2 to support a steering column 4. The steering support 3, which is integrally formed of lightweight metal such as aluminum, is, for example, an aluminum die-cast product.

The steering support 3 includes a first through-hole 3a that penetrates in the Y-axis direction, and the first part 2b of the instrument panel reinforcement body 2 is passed through the first through-hole 3a. In this case, the circumferential surface of the first through-hole 3a is formed to correspond to the outer circumferential surface of the area in the first part 2b of the instrument panel reinforcement body 2 covered with the steering support 3.

When the first part 2b of the instrument panel reinforcement body 2 is passed through the first through-hole 3a, the circumferential surface of the first through-hole 3a and the outer circumferential surface of the first part 2b of the instrument panel reinforcement body 2 are brought into substantially contact with each other.

When the steering support 3 is formed using an aluminum die-cast, the first through-hole 3a may have a tapered shape in which the diameter thereof is expanded toward the Y-axis negative side in such a way that the die can be properly removed from the first through-hole 3a of the steering support 3. Therefore, as described above, the diameter of the first part 2b of the instrument panel reinforcement body 2 is also expanded toward the Y-axis negative side.

As shown in FIGS. 2 and 3, for example, the aforementioned steering support 3 includes, besides the first through-hole 3a, a base part 3b, an arch part 3c, reinforcement arms 3d, and side wall parts 3e. The base part 3b is, for example, a plate-like body having a substantially triangular shape as its basic form when it is seen from the Z-axis direction.

A depressed part 3f is formed on the Z-axis positive side surface of the base part 3b. The depressed part 3f, which has a substantially semicircular shape when it is seen from the Y-axis direction, is extended in the Y-axis direction. Further, bolt holes 3g for joining a fixing tool for fixing the steering column 4 by a bolt are formed in the end part of the base part 3b on the X-axis positive side and the end part of the base part 3b on the X-axis negative side. Further, reinforcement ribs 3h are formed on the X-axis positive side surface and the X-axis negative side surface of the base part 3b.

The arch part 3c is formed on the Z-axis positive side surface of the base part 3b. The arch part 3c, which has a substantially semicircular arc shape when it is seen from the Y-axis direction, is extended in the Y-axis direction. Then the arch part 3c is arranged so as to be opposed to the depressed part 3f in the Z-axis direction, and the inner circumferential surface of the arch part 3c and the circumferential surface of the depressed part 3f form the first through-hole 3a.

The reinforcement arms 3d are provided downwardly in the Z-axis negative side from a corner part of the base part 3b on the X-axis negative side and the Y-axis positive side and a corner part of the base part 3b on the X-axis negative side and the Y-axis negative side. This pair of reinforcement arms 3d is arranged in such a way that the gap in the Y-axis direction increases toward the Z-axis negative side.

The side wall parts 3e are provided downwardly in the Z-axis negative side from the side of the base part 3b on the Y-axis positive side and the side of the base part 3b on the Y-axis negative side. The end part of the side wall part 3e on the X-axis positive side reaches the corner part of the base part 3b on the X-axis positive side and the end part of the side wall part 3e on the X-axis negative side reaches the reinforcement arm 3d.

Figure 4:
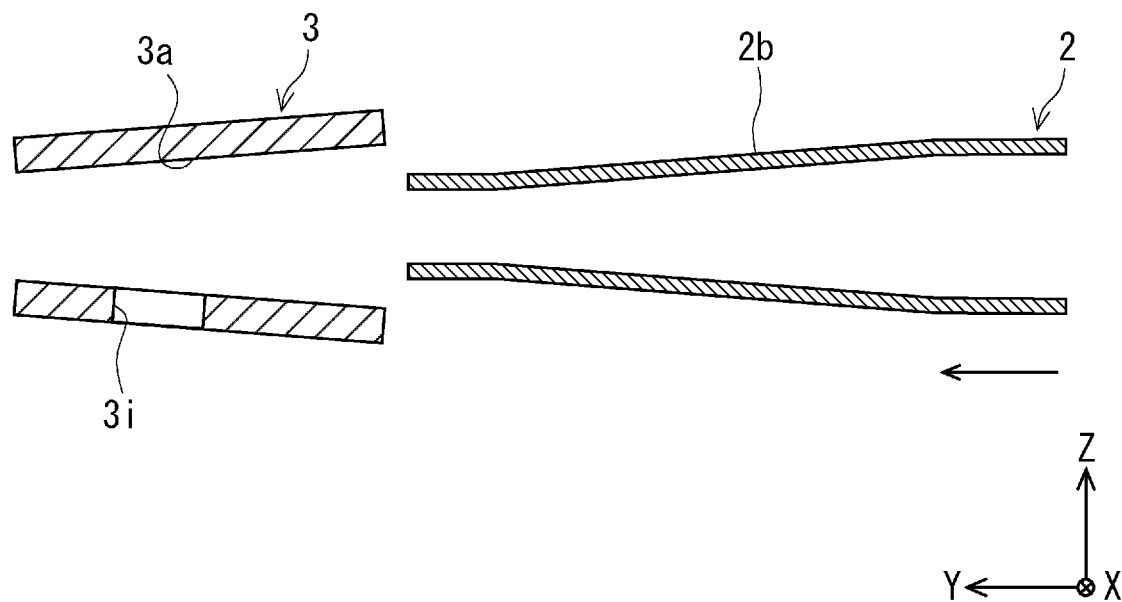
FIG. 4 is a cross-sectional view showing a state in which an instrument panel reinforcement body is passed through a first through-hole of the steering support in a method for fixing the steering support according to the first embodiment.
Figure 5:
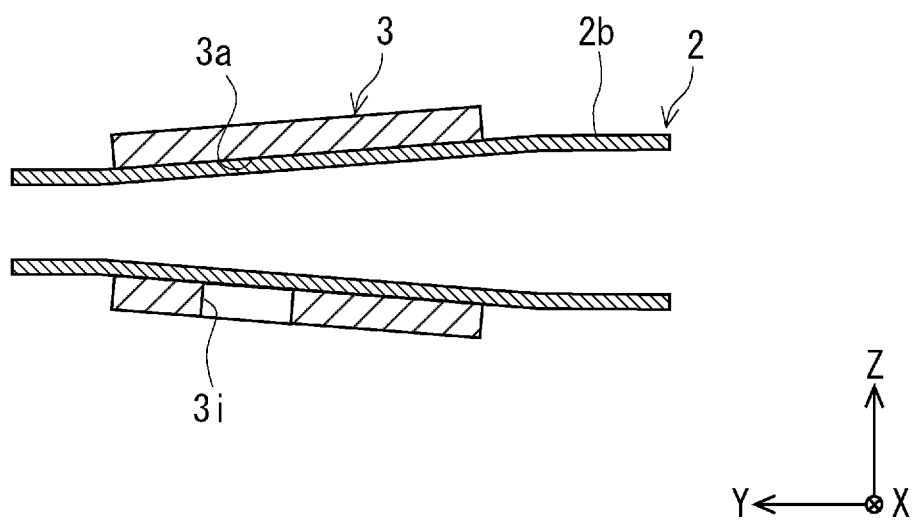
FIG. 5 is a cross-sectional view showing a state in which the instrument panel reinforcement body is inserted into the first through-hole of the steering support in the method for fixing the steering support according to the first embodiment.
Figure 6:
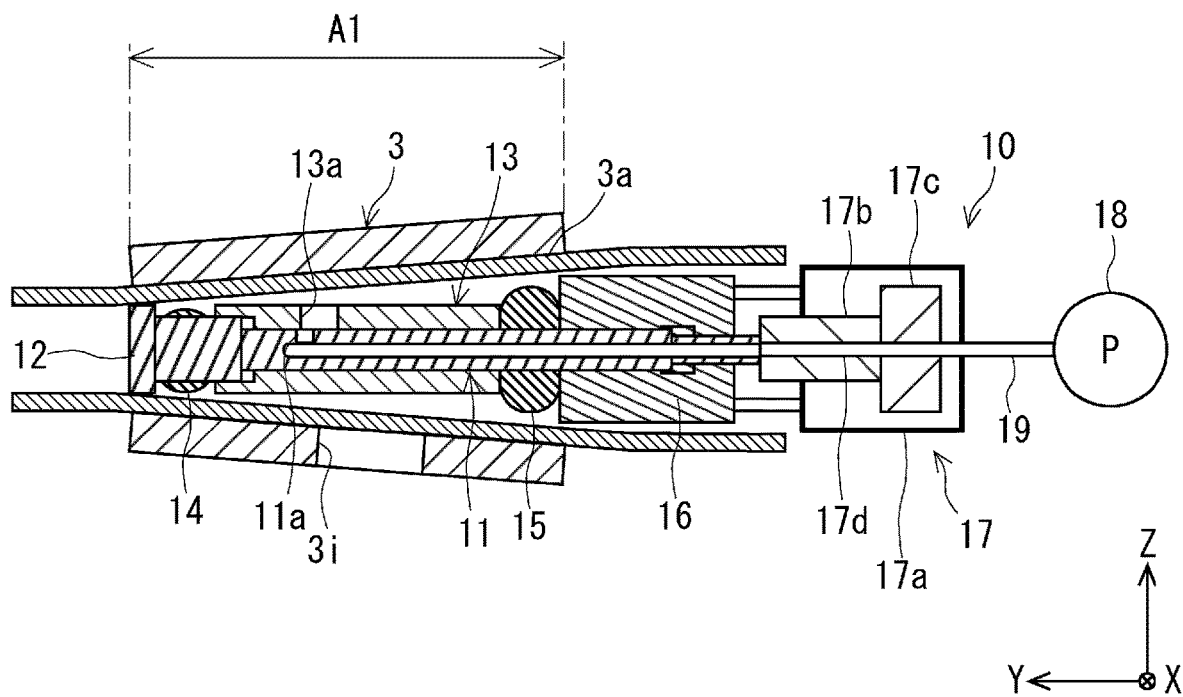
FIG. 6 is a cross-sectional view showing a state in which a fixing device is inserted into the instrument panel reinforcement body in the method for fixing the steering support according to the first embodiment.
Figure 7:
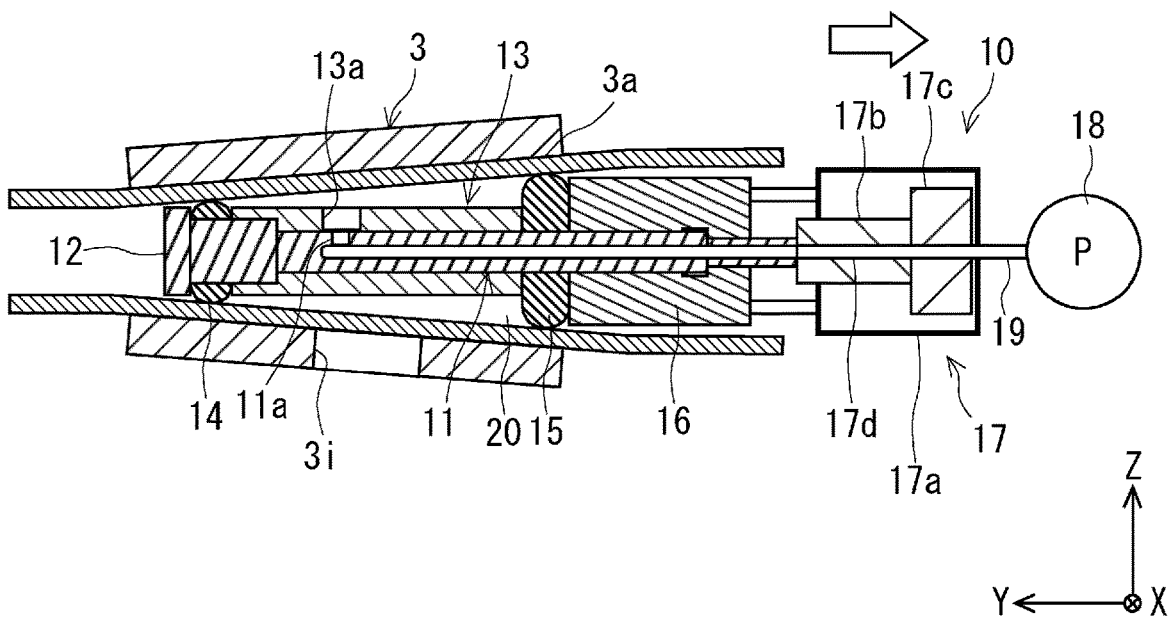
FIG. 7 is a cross-sectional view showing a state in which a first packing and a second packing of the fixing device are deformed in the method for fixing the steering support according to the first embodiment.
Figure 8:
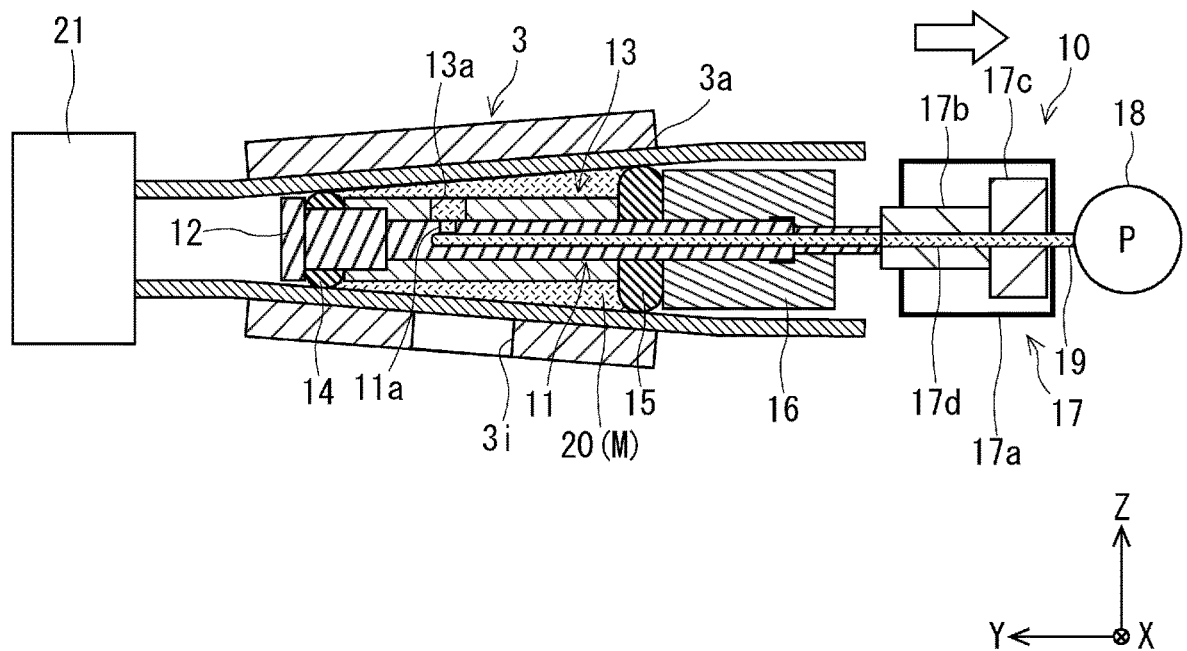
FIG. 8 is a cross-sectional view showing a state in which a pressure medium is supplied to a sealed space in the method for fixing the steering support according to the first embodiment.
Figure 9:
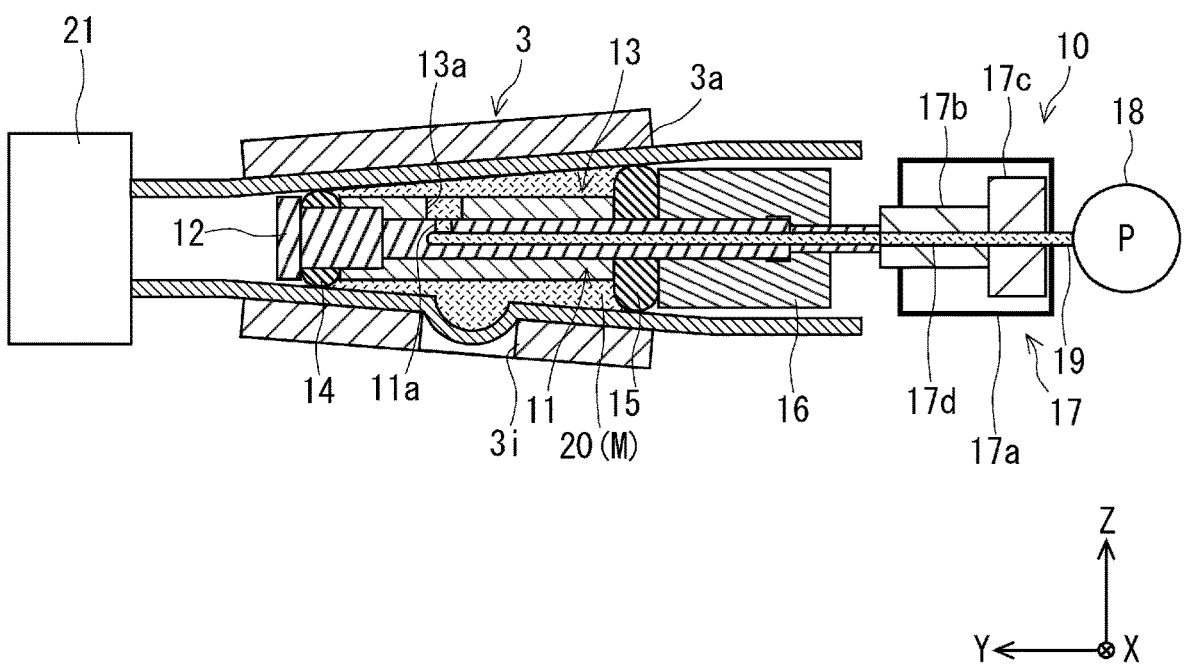
FIG. 9 is a cross-sectional view showing a state in which the steering support is fixed to the instrument panel reinforcement body in the method for fixing the steering support according to the first embodiment.

Next, a flow of the method for fixing the steering support 3 according to this embodiment will be explained. FIG. 4 is a cross-sectional view showing a state in which the instrument panel reinforcement body is passed through the first through-hole of the steering support in the method for fixing the steering support according to this embodiment. FIG. 5 is a cross-sectional view showing a state in which the instrument panel reinforcement body is inserted into the first through-hole of the steering support in the method for fixing the steering support according to this embodiment. FIG. 6 is a cross-sectional view showing a state in which the fixing device is inserted into the instrument panel reinforcement body in the method for fixing the steering support according to this embodiment. FIG. 7 is a cross-sectional view showing a state in which a first packing and a second packing of the fixing device are deformed in the method for fixing the steering support according to this embodiment. FIG. 8 is a cross-sectional view showing a state in which a pressure medium is supplied to a sealed space in the method for fixing the steering support according to this embodiment. FIG. 9 is a cross-sectional view showing a state in which the steering support is fixed to the instrument panel reinforcement body in the method for fixing the steering support according to this embodiment.

First, a configuration of a fixing device 10 used in the method for fixing the steering support 3 according to this embodiment will be explained. The following description of the fixing device 10 will be given based on a state in which it is inserted into the instrument panel reinforcement body 2, as shown in FIG. 6.

As shown in FIG. 6, the fixing device 10 includes a first pipe member 11, an enlarged diameter part 12, a second pipe member 13, a first packing 14, a second packing 15, a reaction force part 16, a driving part 17, and a pump 18. The first pipe member 11 is inserted into the instrument panel reinforcement body 2 from an opening of the instrument panel reinforcement body 2 on the Y-axis negative side.

As shown in FIG. 6, the first pipe member 11 is extended in the Y-axis direction in the state in which the end part of the first pipe member 11 on the Y-axis positive side is inserted to a predetermined position inside the instrument panel reinforcement body 2. Then the first pipe member 11 has such a length that it can reach a part in the vicinity of the end part on the Y-axis positive side of an area A1 covered with the steering support 3 in the first part 2b of the instrument panel reinforcement body 2.

The first pipe member 11 has, for example, a cylindrical shape as its basic form, and the end part of the first pipe member 11 on the Y-axis positive side is blocked. Then a through-hole 11a that penetrates in the thickness direction of the first pipe member 11 is formed in the first pipe member 11.

The enlarged diameter part 12, which has a diameter larger than that of the first pipe member 11, is formed in the end part of the first pipe member 11 on the Y-axis positive side. The first pipe member 11 is passed through the second pipe member 13 in such a way that the first pipe member 11 can be slid therethrough, and the length thereof is smaller than the length of the first through-hole 3a of the steering support 3 in the Y-axis direction.

The second pipe member 13 has, for example, a cylindrical shape as its basic form, and has an inner diameter that is substantially equal to the outer diameter of the first pipe member 11. Then a through-hole 13a that penetrates in the thickness direction of the second pipe member 13 is formed in the second pipe member 13.

The through-hole 13a of the second pipe member 13 is widely formed with respect to the through-hole 11a of the first pipe member 11 in such a way that at least a part of the through-hole 11a of the first pipe member 11 overlaps the through-hole 13a of the second pipe member 13 even when the first pipe member 11 and the second pipe member 13 are relatively moved in the Y-axis direction, as will be described below.

The first packing 14 is an O ring made of resin. As shown in FIG. 6, the first packing 14 is arranged between the enlarged diameter part 12 and the second pipe member 13, and is arranged in a desired position on the Y-axis positive side inside the area A1 of the instrument panel reinforcement body 2 in a state in which the end part of the first pipe member 11 on the Y-axis positive side is inserted to a predetermined position inside the instrument panel reinforcement body 2. That is, the first packing 14 is fixed to the end part of the first pipe member 11 on the Y-axis positive side by the enlarged diameter part 12 and the second pipe member 13.

The outer diameter of the first packing 14 is somewhat smaller than the inner diameter of a desired position on the Y-axis positive side in the area A1 of the instrument panel reinforcement body 2. Then, when the first packing 14 is deformed in a state in which the end part of the first pipe member 11 on the Y-axis positive side is inserted to a predetermined position inside the instrument panel reinforcement body 2, as will be described later, the first packing 14 can be elastically deformed so as to fill the gap between the first pipe member 11 and the instrument panel reinforcement body 2.

The second packing 15 is an O ring made of resin. As shown in FIG. 6, the second packing 15 is arranged between the second pipe member 13 and the reaction force part 16, and is arranged in a desired position on the Y-axis negative side in the area A1 of the instrument panel reinforcement body 2 in a state in which the end part of the first pipe member 11 on the Y-axis positive side is inserted to a predetermined position inside the instrument panel reinforcement body 2. That is, the second packing 15 is fixed to the first pipe member 11 by the second pipe member 13 and the reaction force part 16.

The outer diameter of the second packing 15 is somewhat smaller than the inner diameter of a desired position on the Y-axis negative side in the area A1 of the instrument panel reinforcement body 2. Then, when the second packing 15 is deformed in a state in which the end part of the first pipe member 11 on the Y-axis positive side is inserted to a predetermined position inside the instrument panel reinforcement body 2, as will be described later, the second packing 15 can be elastically deformed so as to fill the gap between the first pipe member 11 and the instrument panel reinforcement body 2.

A part of the first pipe member 11 on the Y-axis negative side is passed through the reaction force part 16 in such a way that it can be slid therethrough. The reaction force part 16 is fixed to another member in such a way that it is not displaced with respect to the instrument panel reinforcement body 2 when the end part of the first pipe member 11 on the Y-axis positive side is inserted to a predetermined position inside the instrument panel reinforcement body 2. The driving part 17 moves the first pipe member 11 in the Y-axis direction.

The driving part 17 includes, for example, a case 17a, a rod 17b, and a piston 17c. The case 17a is fixed to the reaction force part 16. The rod 17b, which is extended in the Y-axis direction, is projected to the Y-axis positive side from the case 17a in such a way that it can be slid in the Y-axis direction with respect to the case 17a. Then the end part of the first pipe member 11 on the Y-axis negative side is fixed to the end part of the rod 17b on the Y-axis positive side.

The piston 17c is fixed to the end part of the rod 17b on the Y-axis negative side. Then, by discharging the pressure medium such as gas or liquid from one of the rooms inside the case 17a on the Y-axis positive side and the Y-axis negative side with the piston 17c interposed therebetween while supplying the pressure medium to the other room, the rod 17b can be moved in the Y-axis direction.

A communication path 17d that communicates with a part inside the first pipe member 11 is formed in the aforementioned driving part 17. The communication path 17d penetrates, for example, the rod 17b and the piston 17c in the Y-axis direction. However, the driving part 17 may have a desired structure as long as it can move the first pipe member 11 in the Y-axis direction and it includes the communication path 17d that communicates with a part inside the first pipe member 11.

The pump 18 supplies the pressure medium such as gas or liquid to the first pipe member 11 and discharges the pressure medium from the first pipe member 11. As shown in FIG. 6, the pump 18 is connected to the communication path 17d of the driving part 17 via a piping 19.

With the use of the aforementioned fixing device 10, as shown in FIG. 4, first, the instrument panel reinforcement body 2 is passed through the first through-hole 3a of the steering support 3. Then, as shown in FIG. 5, the circumferential surface of the first through-hole 3a of the steering support 3 is brought into substantially contact with the outer circumferential surface of the first part 2b of the instrument panel reinforcement body 2.

Next, as shown in FIG. 6, the first pipe member 11 and the like of the fixing device 10 is inserted into the instrument panel reinforcement body 2, and the end part of the first pipe member 11 on the Y-axis positive side is arranged in a predetermined position inside the instrument panel reinforcement body 2. For example, the end part of the first pipe member 11 on the Y-axis positive side is arranged in the end part of the area A1 of the instrument panel reinforcement body 2 on the Y-axis positive side.

Accordingly, the first packing 14 is arranged in the vicinity of the end part on the Y-axis positive side in the area A1 of the instrument panel reinforcement body 2. Then the second packing 15 is arranged in the vicinity of the end part on the Y-axis negative side in the area A1 of the instrument panel reinforcement body 2.

In this case, the first packing 14 is formed to be somewhat smaller than the inner diameter of a desired position on the Y-axis positive side in the area A1 of the instrument panel reinforcement body 2 and the second packing 15 is formed to be somewhat smaller than the inner diameter of a desired position on the Y-axis negative side in the area A1 of the instrument panel reinforcement body 2.

Therefore, when the first packing 14 and the second packing 15 are inserted into the instrument panel reinforcement body 2, the first packing 14 and the second packing 15 are not likely to come into contact with the inner circumferential surface of the instrument panel reinforcement body 2. It is therefore possible to prevent the first packing 14 and the second packing 15 from being damaged.

Next, as shown in FIG. 7, the pressure medium is discharged from the room inside the case 17a of the driving part 17 on the Y-axis negative side while supplying the pressure medium to the room on the Y-axis positive side with the piston 17c interposed therebetween, thereby drawing the first pipe member 11 into the Y-axis negative side. At this time, the case 17a of the driving part 17 is fixed to, for example, an external environment. Accordingly, the reaction force part 16 fixed to the case 17a of the driving part 17 is fixed in such a way that it cannot be displaced with respect to the instrument panel reinforcement body 2.

Then, the first pipe member 11 is drawn into the Y-axis negative side, which causes a gap between the enlarged diameter part 12 and the reaction force part 16 to be reduced, as a result of which the first packing 14 and the second packing 15 are deformed in such a way that they are compressed in the Y-axis direction.

Accordingly, the first packing 14 is deformed in such a way that it expands in the radial direction, and the gap between the part in the vicinity of the end part on the Y-axis positive side inside the area A1 of the instrument panel reinforcement body 2 and the first pipe member 11 is blocked. Further, the second packing 15 is also deformed in such a way that it expands in the radial direction, and the gap between the part in the vicinity of the end part on the Y-axis negative side of the area A1 of the instrument panel reinforcement body 2 and the first pipe member 11 is blocked.

Therefore, a sealed space 20 is formed of the instrument panel reinforcement body 2, the first pipe member 11, the first packing 14, and the second packing 15. At this time, the second pipe member 13 is moved to the Y-axis negative side since the first pipe member 11 is drawn into the Y-axis negative side. However, since the through-hole 13a of the second pipe member 13 is widely formed with respect to the through-hole 11a of the first pipe member 11, the through-hole 11a of the first pipe member 11 and the through-hole 13a of the second pipe member 13 are arranged in such a way that they overlap each other.

Next, as shown in FIG. 8, a pressure medium M is supplied from the pump 18 to the first pipe member 11. Accordingly, the pressure medium M that has passed through the piping 19 is supplied to the sealed space 20 via the through-hole 11a of the first pipe member 11 and the through-hole 13a of the second pipe member 13.

Then the pump 18 further supplies the pressure medium M to the first pipe member 11, which causes the pressure inside the sealed space 20 to increase, resulting in that the pressure inside the area A1 of the instrument panel reinforcement body 2 increases.

When the first part 2b of the instrument panel reinforcement body 2 has such a shape that its diameter is expanded toward the Y-axis negative side, if the pressure of the sealed space 20 increases, the instrument panel reinforcement body 2 and the steering support 3 tend to move to the Y-axis positive side. Therefore, as shown in FIG. 8, the end part of the instrument panel reinforcement body 2 on the Y-axis negative side is preferably fixed by a fixing tool 21.

Further, the pressure medium M continues to be supplied from the pump 18 to increase the pressure inside the sealed space 20, and the area A1 of the instrument panel reinforcement body 2 is plastically deformed from the inside to the outside, and the circumferential surface of the first through-hole 3a of the steering support 3 is pressed on the outer circumferential surface of the instrument panel reinforcement body 2, as shown in FIG. 9. Accordingly, the outer circumferential surface of the area A1 of the instrument panel reinforcement body 2 and the circumferential surface of the first through-hole 3a of the steering support 3 strongly come into contact with each other, and the steering support 3 is fixed to the instrument panel reinforcement body 2.

In this case, the circumferential surface of the first through-hole 3a of the steering support 3 is preferably pressed by the outer circumferential surface of the area A1 of the instrument panel reinforcement body 2 in such a way that the deformation amount of the predetermined position of the steering support 3 (for example, surface of the arch part 3c) becomes equal to or larger than a predetermined first deformation amount at which the steering support 3 starts to be elastically deformed but smaller than a predetermined second deformation amount at which the steering support 3 is broken.

Accordingly, the steering support 3 appears the elastic force, and the steering support 3 strongly constrains the area A1 of the instrument panel reinforcement body 2. As a result, the steering support 3 can be strongly fixed to the instrument panel reinforcement body 2.

After the steering support 3 has been successfully fixed to the instrument panel reinforcement body 2, the pressure medium M is discharged from the sealed space 20 by the pump 18. Then the pressure medium is discharged from the room inside the case 17a of the driving part 17 on the Y-axis positive side while supplying the pressure medium to the room on the Y-axis negative side with the piston 17c interposed therebetween, whereby the first pipe member 11 is pushed into the Y-axis positive side.

Accordingly, the state of each of the first packing 14 and the second packing 15 is restored to the state before the deformation. After that, by removing the first pipe member 11 and the like from inside the instrument panel reinforcement body 2, fixing of the steering support 3 to the instrument panel reinforcement body 2 is completed.

At this time, since the state of each of the first packing 14 and the second packing 15 is restored to the state before the deformation, when the first pipe member 11 and the like are removed from the instrument panel reinforcement body 2, the first packing 14 and the second packing 15 are not likely to come into contact with the inner circumferential surface of the instrument panel reinforcement body 2. It is therefore possible to prevent the first packing 14 and the second packing 15 from being damaged.

When a second through-hole 3i that penetrates in the Z-axis direction from the depressed part 3f in the steering support 3 is formed in the steering support 3, the method for checking deformation of the instrument panel reinforcement body 2 as described below can be executed.

Figure 10:
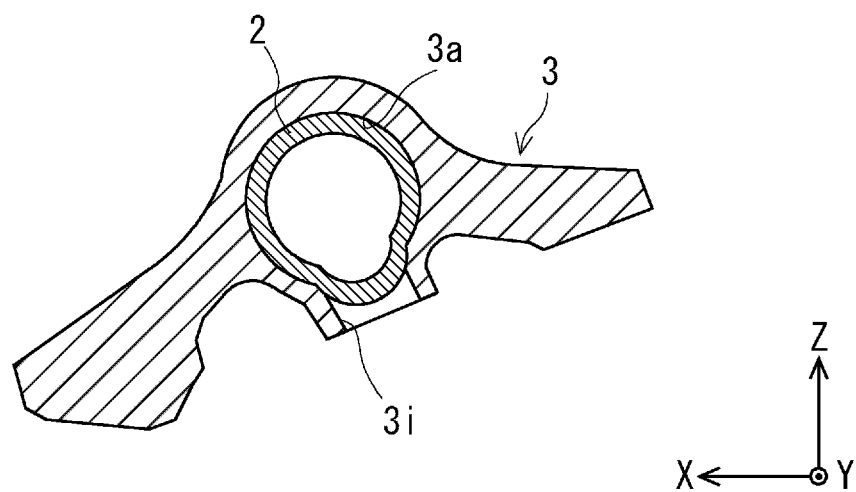
FIG. 10 is a cross-sectional view showing a state in which a part of the instrument panel reinforcement body bulges in a second through-hole of the steering support in a method for checking deformation of the instrument panel reinforcement body according to the first embodiment.
Figure 11:
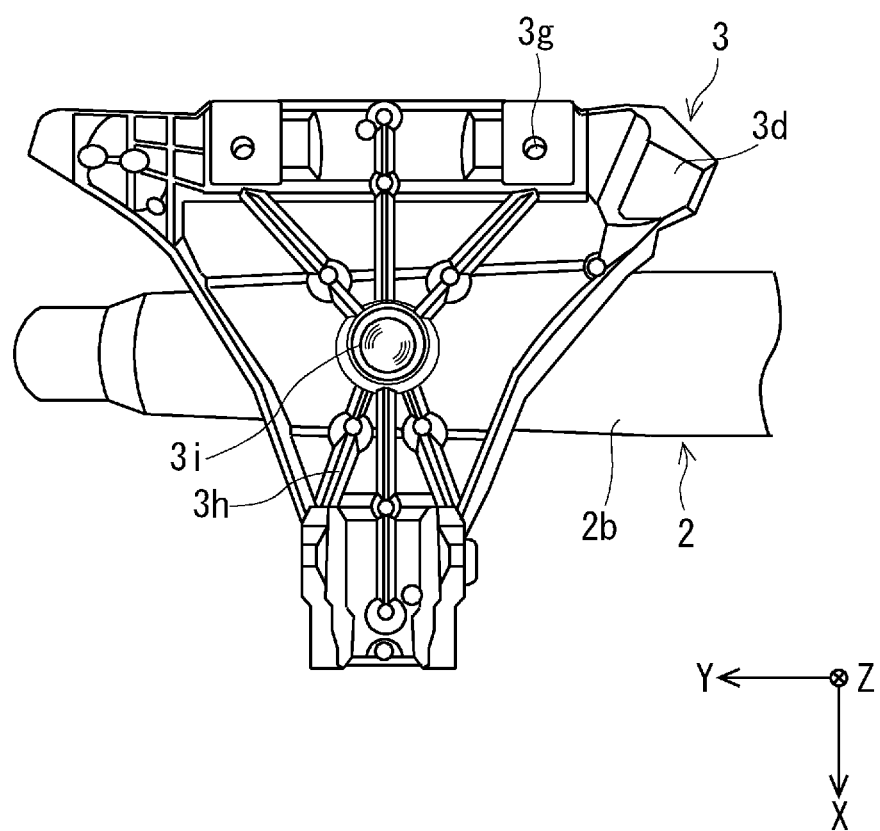
FIG. 11 is a view showing a state in which a part of the instrument panel reinforcement body bulges in the second through-hole of the steering support when it is seen from the Z-axis negative side in the method for checking deformation of the instrument panel reinforcement body according to the first embodiment.

FIG. 10 is a cross-sectional view showing a state in which a part of the instrument panel reinforcement body bulges in the second through-hole of the steering support in the method for checking deformation of the instrument panel reinforcement body according to this embodiment. FIG. 11 is a diagram showing a state in which a part of the instrument panel reinforcement body bulges in the second through-hole of the steering support when it is seen from the Z-axis negative side in the method for checking deformation of the instrument panel reinforcement body according to this embodiment.

When the area A1 of the instrument panel reinforcement body 2 is plastically deformed as described above, as shown in FIGS. 9 to 11, a part of the instrument panel reinforcement body 2 is caused to bulge in the second through-hole 3i, and the amount of bulge of the instrument panel reinforcement body 2 is checked, whereby it is possible to check whether the instrument panel reinforcement body 2 is plastically deformed.

That is, if the state in which a part of the instrument panel reinforcement body 2 bulges from the second through-hole 3i of the steering support 3 is maintained, it can be estimated that the area A1 of the instrument panel reinforcement body 2 is plastically deformed. After that, the bulge amount of the bulged part of the instrument panel reinforcement body 2 (that is, displacement of the instrument panel reinforcement body 2 in the radial direction) is preferably measured using a depth gauge or the like via the second through-hole 3i of the steering support 3, and it may be checked if the measured bulge amount has reached the bulge amount which is a predetermined plastically deformed area.

In this case, the relation between the bulge amount of the bulged part of the instrument panel reinforcement body 2 and the deformation amount of the steering support 3 may be acquired in advance, the bulge amount of the bulged part of the instrument panel reinforcement body 2 may be measured via the second through-hole 3i of the steering support 3 using a depth gauge or the like, and it is possible to check whether the deformation amount of the steering support 3 is equal to or larger than a first deformation amount but is smaller than a second deformation amount based on the results of the measurement.

Incidentally, when the second through-hole 3i of the steering support 3 has a circular shape, the diameter of the second through-hole 3i may be about 30-45% with respect to the outer diameter of the instrument panel reinforcement body 2. However, the steering support 3 may have a desired shape or dimension as long as a part of the instrument panel reinforcement body 2 can be subjected to free bulge deformation without difficulty.

Further, the reinforcement rib 3h provided on the surface of the steering support 3 on the Z-axis negative side is preferably arranged substantially radially from the second through-hole 3i of the steering support 3 in order to prevent stress to be concentrated in the second through-hole 3i while the vehicle travels, as shown in FIG. 11.

When the second through-hole 3i is not formed in the steering support 3, for example, the relation between the deformation state of the instrument panel reinforcement body 2 and the deformation amount of the predetermined position of the steering support 3 may be acquired in advance, a strain gauge or the like may be provided in a predetermined position of the steering support 3, and it may be checked whether the instrument panel reinforcement body 2 has been plastically deformed based on the results of the measurement using a strain gauge or the like.

In this case, it can also be checked whether the deformation amount of the steering support 3 is equal to or larger than a first deformation amount but is smaller than a second deformation amount based on the deformation amount of the predetermined position of the steering support 3 that has been measured.

According to the method for fixing the steering support 3, the device for fixing the steering support 3, and the method for checking deformation of the instrument panel reinforcement body 2, in a state in which the instrument panel reinforcement body 2 is passed through the first through-hole 3a formed in the steering support 3, the area A1 of the instrument panel reinforcement body 2 is plastically deformed, and the circumferential surface of the first through-hole 3a of the steering support 3 is pressed, thereby fixing the steering support 3 to the instrument panel reinforcement body 2.

That is, unlike the typical steering support, the steering support 3 according to this embodiment is not configured to join the first divided piece and the second divided piece to the instrument panel reinforcement body 2 by a bolt. Therefore, the number of processes required to fix the steering support 3 to the instrument panel reinforcement body 2 can be reduced, whereby it is possible to improve the efficiency when the steering support 3 is fixed to the instrument panel reinforcement body 2.

Further, since the steering support 3 according to this embodiment is integrally formed, not a divided structure, which is employed in the typical steering support, the number of components for forming the instrument panel reinforcement 1 can be reduced. Therefore, when the instrument panel reinforcement 1 is formed using the steering support 3 according to this embodiment, the weight of the instrument panel reinforcement 1 can be reduced compared to a case in which the instrument panel reinforcement is formed using the typical steering support. Further, the steering support 3 is more rigid than the typical steering support having a divided structure is.

As described above, it is possible to make the steering support 3 lighter and more rigid than the typical steering support having a divided structure are. Therefore, compared to a case in which the typical steering support having a divided structure is employed for the instrument panel reinforcement, the resonance frequency of each of the instrument panel reinforcement body 2 and the steering support 3 can be shifted to a high-frequency side.

Further, in the method for checking deformation of the instrument panel reinforcement body 2 according to this embodiment, the amount of bulge of the instrument panel reinforcement body 2 is checked, whereby it is possible to check whether the instrument panel reinforcement body 2 is plastically deformed. When the instrument panel reinforcement body 2 bulges from the second through-hole 3i of the steering support 3, the first through-hole 3a of the steering support 3 is strongly pressed by the area A1 of the instrument panel reinforcement body 2, and it can be estimated that the steering support 3 has already been fixed to the instrument panel reinforcement body 2. Therefore, the pump 18 can be controlled without using the pressure sensor for measuring the pressure inside the instrument panel reinforcement body 2.

Next, frequency characteristics of the instrument panel reinforcement body 2 and the steering support 3 of the instrument panel reinforcement 1 manufactured using the method for fixing the steering support 3 according to this embodiment are compared with frequency characteristics of an instrument panel reinforcement body and a steering support of an instrument panel reinforcement manufactured as a target to be compared.

Figure 12:
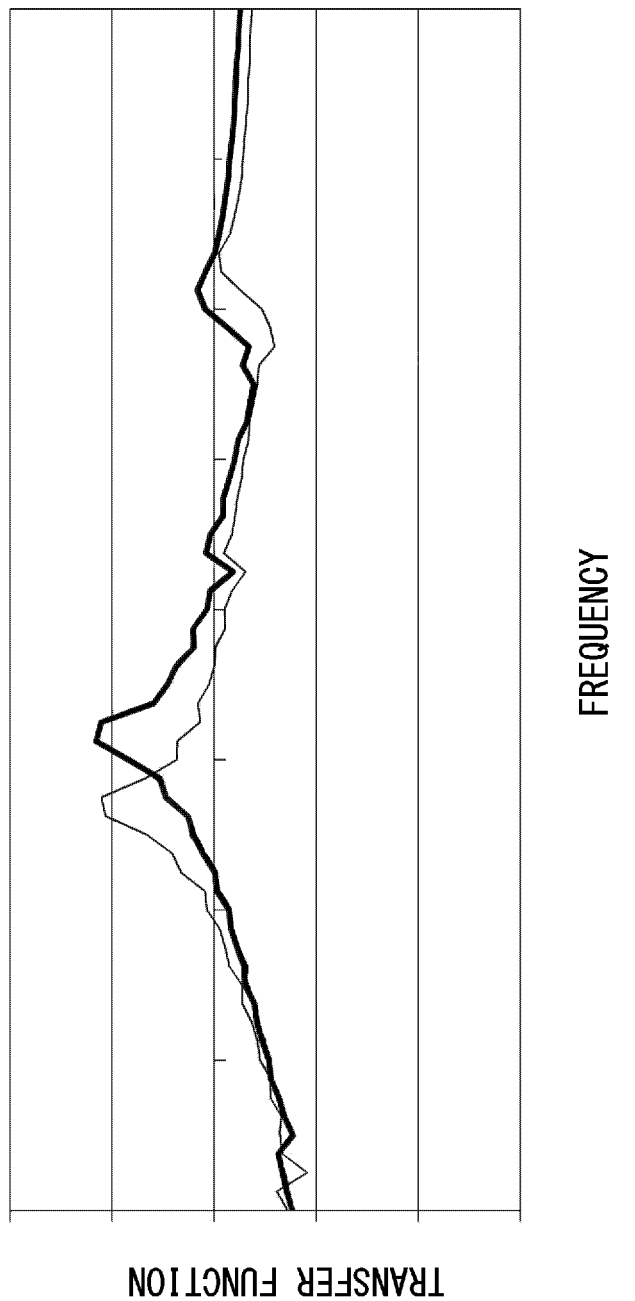
FIG. 12 is a diagram showing results of comparing frequency characteristics of the instrument panel reinforcement body of the instrument panel reinforcement manufactured using the method for fixing the steering support according to the first embodiment and frequency characteristics of an instrument panel reinforcement body of an instrument panel reinforcement manufactured as a target to be compared.
Figure 13:
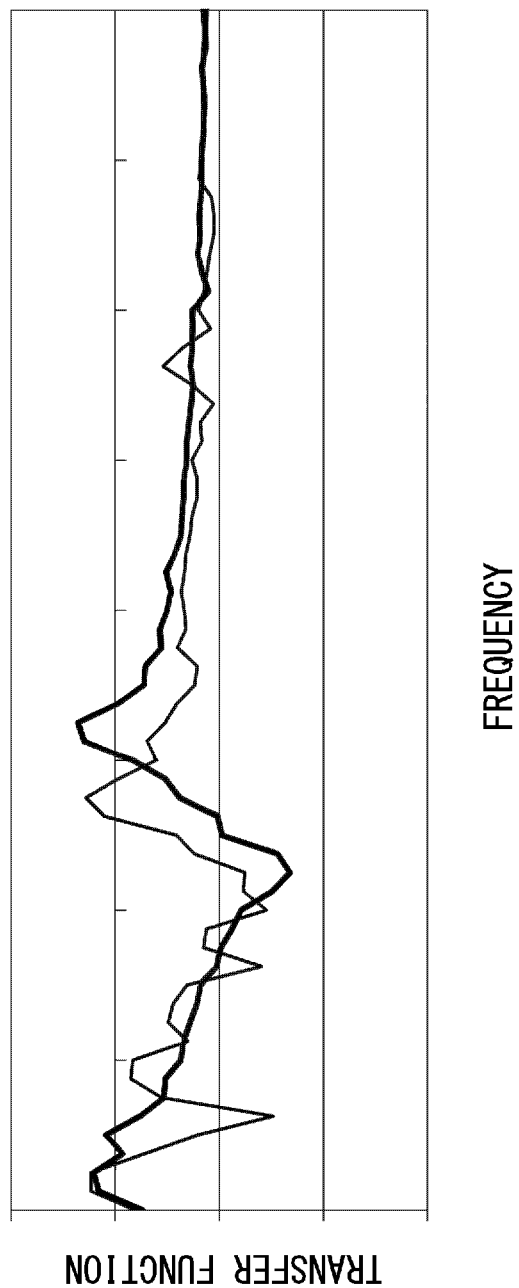
FIG. 13 is a diagram showing results of comparing frequency characteristics of the steering support of the instrument panel reinforcement manufactured using the method for fixing the steering support according to the first embodiment and frequency characteristics of a steering support of the instrument panel reinforcement manufactured as a target to be compared.

FIG. 12 is a diagram showing results of comparing the frequency characteristics of the instrument panel reinforcement body of the instrument panel reinforcement manufactured using the method for fixing the steering support according to this embodiment with the frequency characteristics of the instrument panel reinforcement body of the instrument panel reinforcement manufactured as a target to be compared. FIG. 13 is a diagram showing results of comparing the frequency characteristics of the steering support of the instrument panel reinforcement manufactured using the method for fixing the steering support according to this embodiment with the frequency characteristics of the steering support of the instrument panel reinforcement manufactured as a target to be compared.

When, for example, both the instrument panel reinforcement body and the steering support are formed of lightweight metal in order to reduce the weight of the instrument panel reinforcement, the cost of the components becomes high. In order to reduce the cost, only the steering support may be formed of lightweight metal. However, when the material of the instrument panel reinforcement body is different from that of the steering support, it is difficult to weld them together.

In order to solve the aforementioned problem, the instrument panel reinforcement body and one divided piece of the steering support may be made of steel, the instrument panel reinforcement body and one divided piece of the steering support may be joined together by welding in advance, and then the other divided piece of the steering support formed of lightweight metal may be joined to one divided piece by a bolt, whereby it is possible to manufacture a relatively lightweight instrument panel reinforcement. This instrument panel reinforcement has been manufactured as a target to be compared.

While the instrument panel reinforcement to be compared is also configured to reduce the weight as described above, compared to this instrument panel reinforcement, the instrument panel reinforcement body 2 of the instrument panel reinforcement 1 manufactured using the method for fixing the steering support 3 according to this embodiment has successfully shifted the resonance frequency to the high-frequency side compared to the instrument panel reinforcement body of the instrument panel reinforcement to be compared, as shown in FIG. 12.

In FIG. 12, the thick line indicates the frequency characteristics of the instrument panel reinforcement body 2 of the instrument panel reinforcement 1 manufactured using the method for fixing the steering support 3 according to this embodiment and the thin line indicates the frequency characteristics of the instrument panel reinforcement body of the instrument panel reinforcement to be compared.

Further, as shown in FIG. 13, the steering support 3 of the instrument panel reinforcement 1 manufactured using the method for fixing the steering support 3 according to this embodiment is able to shift the resonance frequency to the high-frequency side compared to the steering support of the instrument panel reinforcement to be compared.

In FIG. 13, the thick line indicates the frequency characteristics of the steering support 3 of the instrument panel reinforcement 1 manufactured using the method for fixing the steering support 3 according to this embodiment, and the thin line indicates the frequency characteristics of the steering support of the instrument panel reinforcement to be compared.

As described above, the instrument panel reinforcement 1 manufactured using the method for fixing the steering support 3 according to this embodiment is able to shift the resonance frequency of the instrument panel reinforcement body and the steering support to a high-frequency side compared to the instrument panel reinforcement to be compared. Therefore, when the instrument panel reinforcement 1 according to this embodiment is provided in the vehicle, the operability of a vehicle can be improved compared to a case in which the instrument panel reinforcement to be compared is provided in the vehicle.

Second Embodiment

Figure 14:
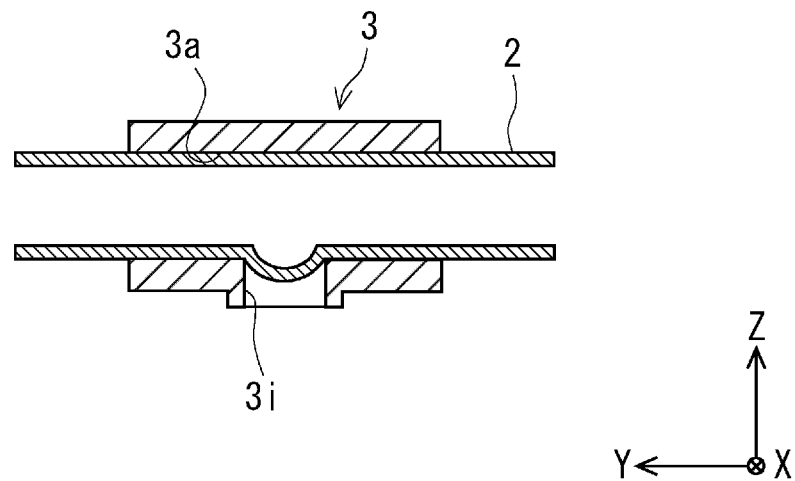
FIG. 14 is a cross-sectional view showing a state in which a steering support is fixed to an instrument panel reinforcement body in a method for fixing a steering support according to a second embodiment.

While the first through-hole 3a of the steering support 3 according to the first embodiment is formed to have a tapered shape in such a way that the diameter thereof is expanded toward the Y-axis negative side, the first through-hole 3a of the steering support 3 may be formed to have a straight shape, as shown in FIG. 14. In this case, the first part 2b of the instrument panel reinforcement body 2 is also formed to have a straight shape in such a way that it corresponds to the first through-hole 3a of the steering support 3.

Figure 15:
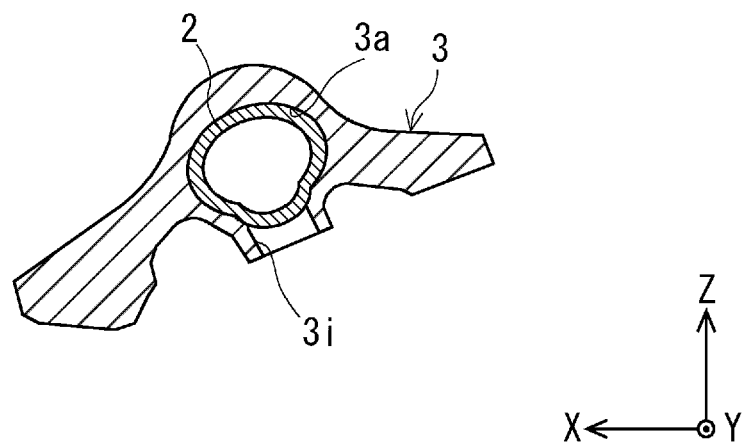
FIG. 15 is a cross-sectional view showing a state in which another steering support is fixed to the instrument panel reinforcement body in the method for fixing the steering support according to the second embodiment.
Figure 16:
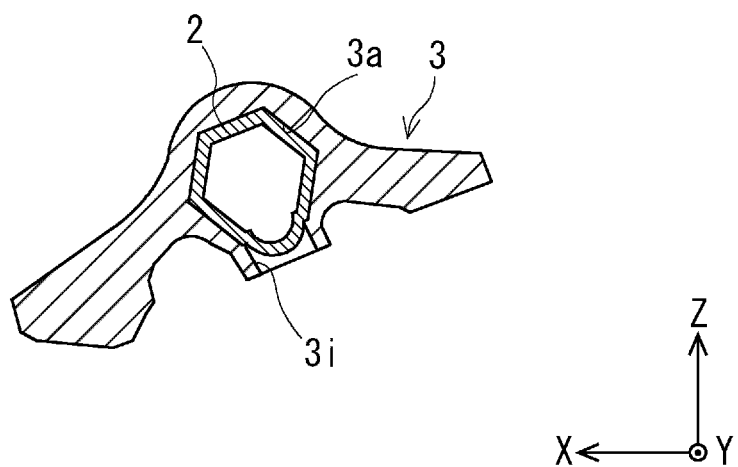
FIG. 16 is a cross-sectional view showing a state in which another steering support is fixed to the instrument panel reinforcement body in the method for fixing the steering support according to the second embodiment.

Further, the outer shape of the instrument panel reinforcement body 2 may be an oval shape as shown in FIG. 15 or may be a polygonal shape as shown in FIG. 16. In short, the XZ cross-sectional shape of the instrument panel reinforcement body 2 is not limited. In this case, the first through-hole 3a of the steering support 3 may be formed in such a way that it corresponds to the outer shape of the instrument panel reinforcement body 2.

Third Embodiment

While a part of the instrument panel reinforcement body 2 is caused to bulge in the second through-hole 3i of the steering support 3 in the first and second embodiments, this is merely one example. For example, a thinned part is formed on the circumferential surface of the first through-hole of the steering support 3 in advance. A part of the instrument panel reinforcement body 2 is caused to bulge so as to contact the thinned part of the steering support 3, and the instrument panel reinforcement body 2 is caused to bulge and the thinned part of the steering support 3 is deformed, whereby the thinned part is broken.

More specifically, the thinned part of the steering support 3 is configured to be easily broken compared to the instrument panel reinforcement body 2. With this structure, when the thinned part of the steering support 3 is deformed along with the deformation of the instrument panel reinforcement body 2, this thinned part is broken before the instrument panel reinforcement body 2 is, and the bulged part of the instrument panel reinforcement body 2 appears from this broken part.

Then, when the state in which the bulged part of the instrument panel reinforcement body 2 bulges is maintained, it can be estimated that the area A1 of the instrument panel reinforcement body 2 is plastically deformed. After that, the bulge amount of the bulged part of the instrument panel reinforcement body 2 may be measured via the broken part of the steering support 3 using a depth gauge or the like, and it may be checked whether the measured bulge amount has reached the bulge amount which is a predetermined plastically deformed area.

At this time, the relation between the bulge amount of the bulged part of the instrument panel reinforcement body 2 and the deformation amount of the steering support 3 is acquired in advance, the bulge amount of the bulged part of the instrument panel reinforcement body 2 is measured using a depth gauge or the like via the broken part of the steering support 3, and it may be checked, based on the results of the measurement, whether the deformation amount of the steering support 3 is equal to or larger than a first deformation amount but is smaller than a second deformation amount.

However, while the thinned part of the steering support 3 is broken in this embodiment, the thinned part of the steering support 3 may not be broken if the thinned part can follow the deformation of the bulged part of the instrument panel reinforcement body 2. That is, it is possible to check whether the area A1 of the instrument panel reinforcement body 2 is plastically deformed by checking the deformed degree of the thinned part.

Fourth Embodiment

While the fixing device 10 of the steering support 3 according to the first embodiment is configured to be able to increase a part of the pressure inside the instrument panel reinforcement body 2, this is merely one example.

Figure 17:
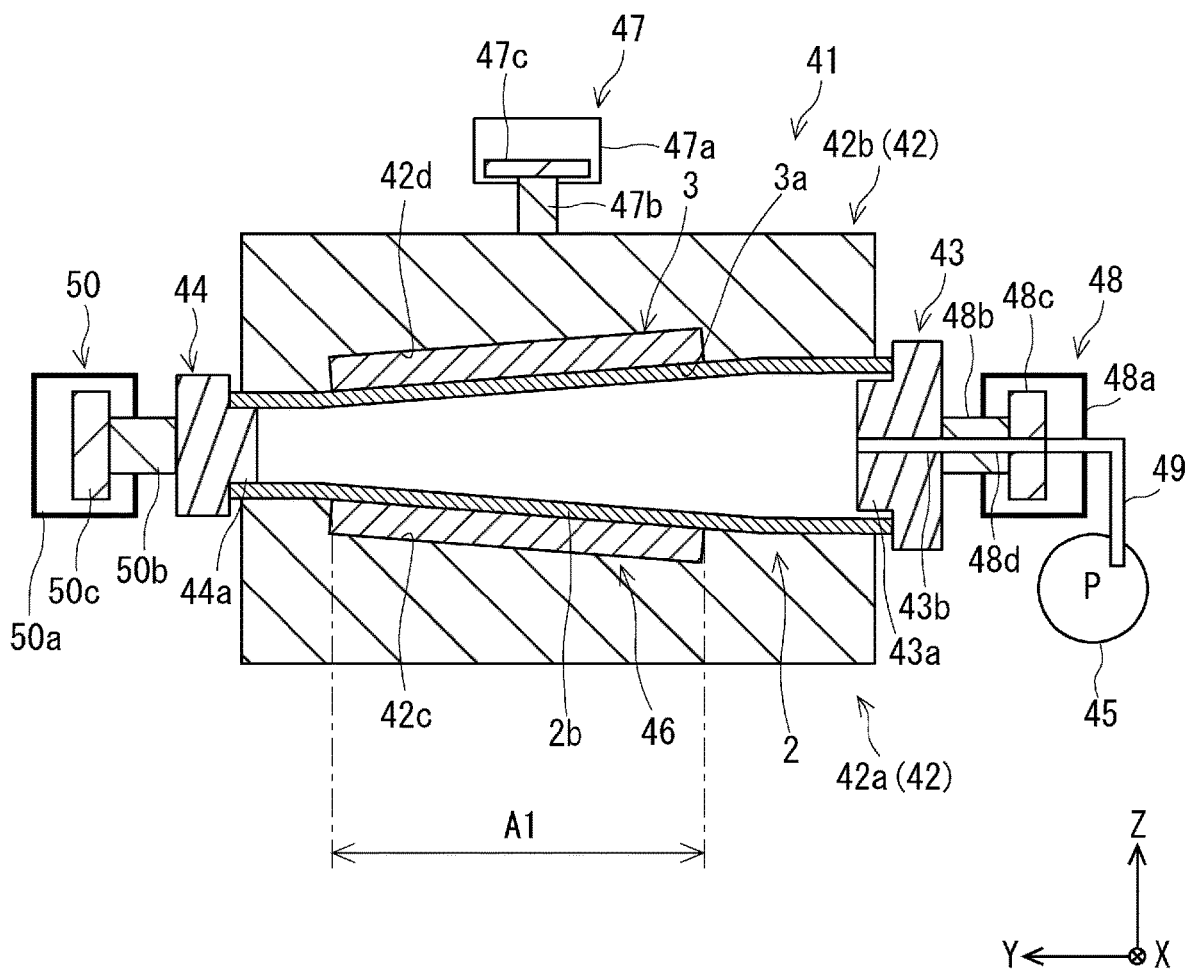
FIG. 17 is a cross-sectional view showing a state in which a steering support is fixed to an instrument panel reinforcement body using a device for fixing a steering support according to a third embodiment.
Figure 18:
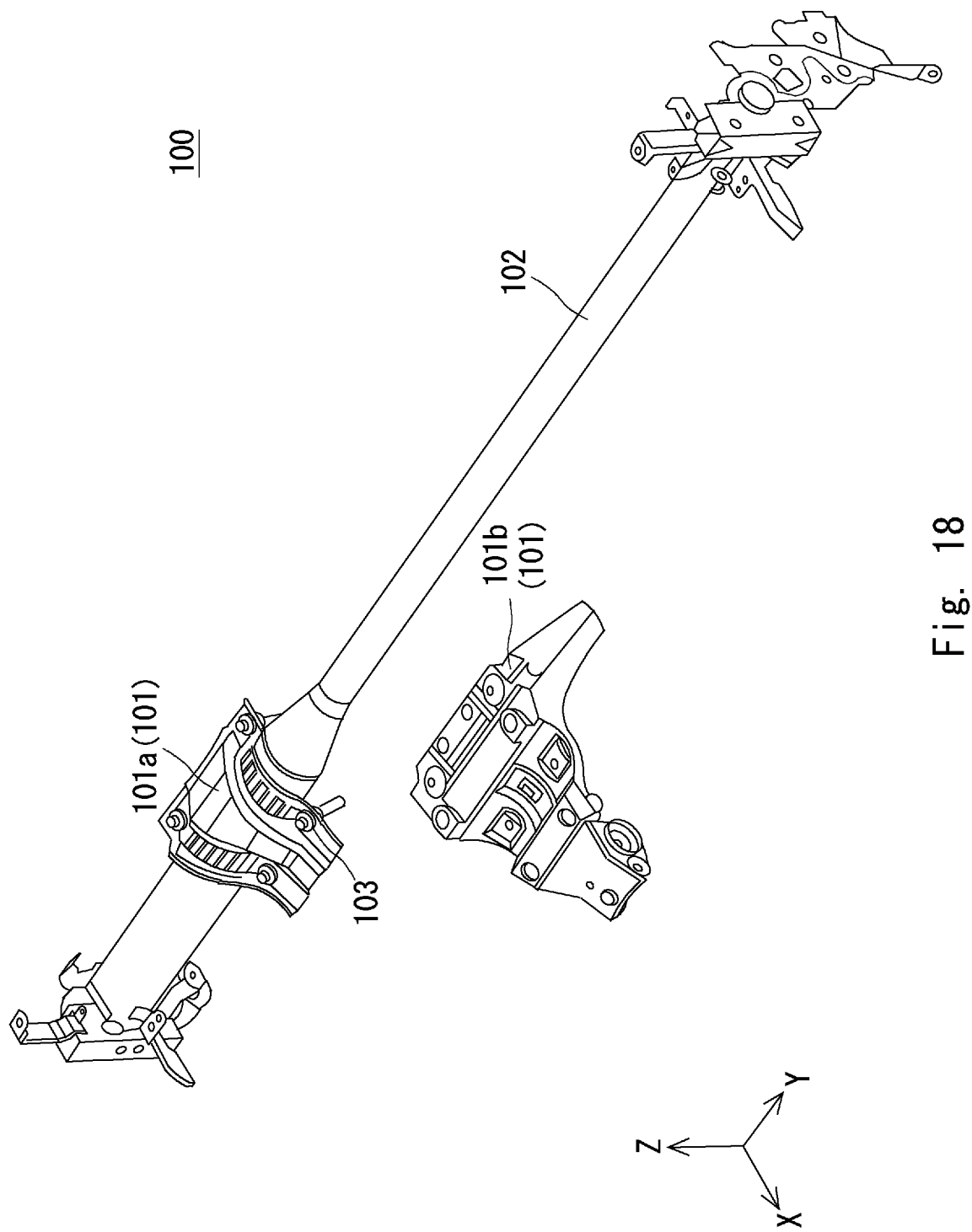
FIG. 18 is an exploded view schematically showing a typical instrument panel reinforcement.

First, a configuration of a device for fixing a steering support according to this embodiment will be explained. FIG. 17 is a cross-sectional view showing a state in which the steering support is fixed to the instrument panel reinforcement body using the device for fixing the steering support according to this embodiment. The descriptions already given in regard to the first embodiment are omitted and elements the same as those in the first embodiment are denoted by reference symbols the same as those in the first embodiment.

A fixing device 41 includes, as shown in FIG. 17, a constraint die 42, a first sealed part 43, a second sealed part 44, and a pump 45. The constraint die 42, which includes a first die 42a and a second die 42b that can be opened and closed, can constrain the outer circumferential surface of a temporarily assembled unit 46 in which the instrument panel reinforcement body 2 is passed through the first through-hole 3a of the steering support 3 in a state in which the first die 42a and the second die 42b are closed.

The first die 42a is, for example, a lower die, and a concave part 42c that corresponds to the outer circumferential surface of the part of the Z-axis negative side with respect to the central axis of the temporarily assembled unit 46 is formed on the Z-axis positive side surface of the first die 42a. The first die 42a is, for example, fixed to an external environment.

The second die 42b is, for example, an upper die, and a concave part 42d that corresponds to the outer circumferential surface of the part of the Z-axis positive side with respect to the central axis of the temporarily assembled unit 46 is formed on the Z-axis negative side surface of the second die 42b. The second die 42b can be moved, for example, in the Z-axis direction by a first driving part 47.

The first driving part 47 includes, for example, a case 47a, a rod 47b, and a piston 47c. The case 47a is fixed in an external environment. The rod 47b, which is extended in the Z-axis direction, is projected to the Z-axis negative side from the case 47a in such a way that the rod 47b can be slid with respect to the case 47a. Then the second die 42b is fixed to the end part of the rod 47b on the Z-axis negative side.

The piston 47c is accommodated inside the case 47a in such a way that the piston 47c can be slid in the Z-axis direction, and is fixed to the end part of the rod 47b on the Z-axis positive side. When the pressure medium is discharged from one of the rooms inside the case 47a on the Z-axis positive side and the Z-axis negative side with the piston 47c interposed therebetween while supplying the pressure medium to the other room in the above first driving part 47, the second die 42b can be moved in the Z-axis direction. However, the first driving part 47 may have a desired structure as long as it allows the second die 42b to be moved in the Z-axis direction.

The first sealed part 43 is movable in the Y-axis direction by using the second driving part 48, and is able to block the opening of the instrument panel reinforcement body 2 on the Y-axis negative side in the state in which the first sealed part 43 contacts this opening.

For example, the first sealed part 43 has a columnar shape as its basic form, and a fitting part 43a having substantially the same diameter as the diameter of the opening of the instrument panel reinforcement body 2 on the Y-axis negative side is formed on the Y-axis positive side. A through-hole 43b penetrating in the Y-axis direction is formed in the first sealed part 43. However, the first sealed part 43 may have a desired shape as long as the first sealed part 43 is able to block the opening of the instrument panel reinforcement body 2 on the Y-axis negative side and includes the through-hole 43b penetrating in the Y-axis direction.

The second driving part 48 includes, for example, a case 48a, a rod 48b, and a piston 48c. The case 48a is fixed to an external environment. The rod 48b, which is extended in the Y-axis direction, is projected in the Y-axis positive side from the case 48a in such a way that the rod 48b can be slid with respect to the case 48a. Then the end part of the first sealed part 43 on the Y-axis negative side is fixed to the end part of the rod 48b on the Y-axis positive side.

The piston 48c is fixed to the end part of the rod 48b on the Y-axis negative side. When the pressure medium is discharged from one of the rooms inside the case 48a on the Y-axis positive side and the Y-axis negative side with the piston 48c interposed therebetween while supplying the pressure medium to the other room in the above second driving part 48, the first sealed part 43 can be moved in the Y-axis direction.

A communication path 48d that communicates with the through-hole 43b of the first sealed part 43 is formed in the second driving part 48. The communication path 48d penetrates, for example, the rod 48b and the piston 48c in the Y-axis direction. However, the second driving part 48 may have a desired structure as long as the second driving part 48 can move the first sealed part 43 in the Y-axis direction and includes the communication path 48d that communicates with the through-hole 43b of the first sealed part 43.

The pump 45 supplies the pressure medium to the instrument panel reinforcement body 2 and discharges the pressure medium from the instrument panel reinforcement body 2, as will be described below. The pump 45 is connected to the communication path 48d of the second driving part 48 via a piping 49.

The second sealed part 44, which can be moved in the Y-axis direction by a third driving part 50, can block the opening of the instrument panel reinforcement body 2 on the Y-axis positive side in a state in which it contacts this opening.

For example, the second sealed part 44 has a columnar shape as its basic form, and a fitting part 44a having substantially the same diameter as that of the opening of the instrument panel reinforcement body 2 on the Y-axis positive side is formed on the Y-axis negative side of the second sealed part 44. However, the second sealed part 44 may have a desired shape as long as it can block the opening of the instrument panel reinforcement body 2 on the Y-axis positive side.

While the descriptions of the third driving part 50 will be omitted since the structure of the third driving part 50 is substantially equal to that of the second driving part 48, the third driving part 50 includes a case 50a, a rod 50b, and a piston 50c. However, the third driving part 50 may have a desired structure as long as the third driving part 50 can move the second sealed part 44 in the Y-axis direction.

Next, a flow of fixing the steering support 3 using the fixing device 41 according to this embodiment will be explained. Similar to the structure in the first embodiment, the first part 2*b* of the instrument panel reinforcement body 2 is passed through the first through-hole 3*a* of the steering support 3, whereby the temporarily assembled unit 46 is formed.

Next, the pressure medium is discharged from the room inside the case 48*a* of the second driving part 48 on the Y-axis positive side while supplying the pressure medium to the room on the Y-axis negative side with the piston 48*c* interposed therebetween, the first sealed part 43 is moved to the Y-axis positive side, and the fitting part 43*a* of the first sealed part 43 is fitted into the opening of the instrument panel reinforcement body 2 on the Y-axis negative side.

Along with the above, the pressure medium is discharged from the room inside the case 50*a* of the third driving part 50 on the Y-axis negative side while supplying the pressure medium to the room on the Y-axis positive side with the piston 50*c* interposed therebetween, the second sealed part 44 is moved to the Y-axis negative side, and the fitting part 44*a* of the second sealed part 44 is fitted into the opening of the instrument panel reinforcement body 2 on the Y-axis positive side. Accordingly, the openings of the instrument panel reinforcement body 2 on the Y-axis positive side and the Y-axis negative side are blocked.

Next, the pressure medium is discharged from the room inside the case 47*a* of the first driving part 47 on the Z-axis negative side while supplying the pressure medium to the room on the Z-axis positive side with the piston 47*c* interposed therebetween, the second die 42*b* is moved to the Z-axis negative side, and the first die 42*a* and the second die 42*b* are closed. Accordingly, the outer circumferential surface of the temporarily assembled unit 46 is constrained by the concave part 42*c* of the first die 42*a* and the concave part 42*d* of the second die 42*b*.

Next, the pressure medium is supplied to the inside of the instrument panel reinforcement body 2 from the pump 45 via the piping 49, the communication path 48*d* of the second driving part 48 and the through-hole 43*b* of the first sealed part 43. Then the area A1 of the instrument panel reinforcement body 2 is plastically deformed from the inside to the outside, and the circumferential surface of the first through-hole 3*a* of the steering support 3 is pressed by the outer circumferential surface of the area A1 of the instrument panel reinforcement body 2.

In this case, the area other than the area A1 of the instrument panel reinforcement body 2 is not substantially deformed since it is constrained by the concave part 42*c* of the first die 42*a* and the concave part 42*d* of the second die 42*b*. On the other hand, since the area A1 of the instrument panel reinforcement body 2 is not directly constrained by the concave part 42*c* of the first die 42*a* and the concave part 42*d* of the second die 42*b*, this area A1 is plastically deformed so as to press the circumferential surface of the first through-hole 3*a* of the steering support 3. Accordingly, the steering support 3 is fixed to the instrument panel reinforcement body 2.

Incidentally, the relation between the pressure at which the pressure medium is supplied from the pump 45 and the deformation state of the instrument panel reinforcement body 2 may be acquired in advance, and it may be determined whether the area A1 of the instrument panel reinforcement body 2 has been plastically deformed based on this relation and the measured value of the pressure at which the pressure medium is supplied from the pump 45 measured using a pressure sensor or the like.

After that, the pressure medium is discharged from the room inside the case 48*a* of the second driving part 48 on the Y-axis negative side while supplying the pressure medium to the room on the Y-axis positive side with the piston 48*c* interposed therebetween, and the first sealed part 43 is moved to the Y-axis negative side. At the same time, the pressure medium is discharged from the room inside the case 50*a* of the third driving part 50 on the Y-axis positive side while supplying the pressure medium to the room on the Y-axis negative side with the piston 50*c* interposed therebetween, and the second sealed part 44 is moved to the Y-axis positive side. Accordingly, the first sealed part 43 and the second sealed part 44 are separated from the instrument panel reinforcement body 2.

Then, the pressure medium is discharged from the room inside the case 47*a* of the first driving part 47 on the Z-axis positive side while supplying the pressure medium to the room on the Z-axis negative side with the piston 47*c* interposed therebetween, and the second die 42*b* is moved to the Z-axis positive side, thereby separating the first die 42*a* from the second die 42*b*. Accordingly, the instrument panel reinforcement 1 in which the steering support 3 is fixed to the instrument panel reinforcement body 2 can be removed from the fixing device 41.

As described above, similar to the fixing device 10 according to the first embodiment, the fixing device 41 of the steering support 3 according to this embodiment is also able to plastically deform the area A1 of the instrument panel reinforcement body 2 and press the circumferential surface of the first through-hole 3*a* of the steering support 3 on the outer circumferential surface of the instrument panel reinforcement body 2. Therefore, similar to the structure in the first embodiment, the number of processes required to fix the steering support 3 to the instrument panel reinforcement body 2 can be reduced, whereby it is possible to contribute to simplification of the manufacturing of the instrument panel reinforcement 1.

The present disclosure is not limited to the above embodiments and may be changed as appropriate without departing from the spirit of the present disclosure.

For example, while the sealed space 20 is formed by deforming the first packing 14 and the second packing 15 in the first embodiment, this is merely one example. The sealed space 20 may be formed, for example, as follows. For example, the outer diameter of the first packing 14 is formed to be equal to the inner diameter of a desired position on the Y-axis positive side in the area A1 of the instrument panel reinforcement body 2, and the outer diameter of the second packing 15 is formed to be equal to the inner diameter of a desired position on the Y-axis negative side in the area A1 of the instrument panel reinforcement body 2. Then the first pipe member 11 and the like are inserted into the instrument panel reinforcement body 2, and the end part of the first pipe member 11 on the Y-axis positive side is arranged in a predetermined position inside the instrument panel reinforcement body 2, whereby the sealed space 20 is formed. In this case, the second pipe member 13 and the driving part 17 may be omitted. In short, it is sufficient that the device for fixing the steering support 3 have a structure in which the area A1 of the instrument panel reinforcement body 2 can be plastically deformed from the inside to the outside.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for fixing a steering support for supporting a steering column to an instrument panel reinforcement body having a pipe shape, the method comprising the processes of:
   passing the instrument panel reinforcement body through a first through-hole formed in the steering support;
   increasing the pressure inside an area of the instrument panel reinforcement body covered with the steering support, plastically deforming the area of the instrument panel reinforcement body from an inside to an outside, and pressing a circumferential surface of the first through-hole of the steering support by an outer circumferential surface of the area of the instrument panel reinforcement body; and
   causing, when the instrument panel reinforcement body is plastically deformed, a part of the instrument panel reinforcement body to bulge in a second through-hole that penetrates the steering support in a thickness direction of the steering support or causing a part of the instrument panel reinforcement body to bulge in such a way that it contacts a thinned part formed on the circumferential surface of the first through-hole of the steering support, thereby causing the instrument panel reinforcement body to bulge and causing the thinned part to be deformed.

2. The method for fixing the steering support according to claim 1, comprising pressing the circumferential surface of the first through-hole of the steering support in such a way that the deformation amount of the steering support becomes equal to or larger than a predetermined first deformation amount at which the steering support starts to be elastically deformed but smaller than a predetermined second deformation amount at which the steering support is broken.

3. A method for checking deformation of an instrument panel reinforcement body having a pipe shape when a steering support for supporting a steering column is fixed to the instrument panel reinforcement body, the method comprising:
   causing, when the pressure inside an area of the instrument panel reinforcement body that has been passed through a first through-hole formed in the steering support covered with the steering support is increased, a part of the instrument panel reinforcement body to bulge in a second through-hole that penetrates the steering support in a thickness direction of the steering support, or causing a part of the instrument panel reinforcement body to bulge in such a way that it contacts a thinned part formed on a circumferential surface of the first through-hole of the steering support, thereby causing the instrument panel reinforcement body to bulge and causing the thinned part to be deformed.

* * * * *